United States Patent [19]

Sasaki

[11] Patent Number: 4,466,234

[45] Date of Patent: Aug. 21, 1984

[54] DISK MOWER

[75] Inventor: Chuichi Sasaki, Towada, Japan

[73] Assignee: Sasaki Nouki Kabushiki Kaisha, Towada, Japan

[21] Appl. No.: 443,451

[22] Filed: Nov. 22, 1982

[51] Int. Cl.³ .............. A01D 35/264; A01D 55/262; A01D 69/06

[52] U.S. Cl. .......................................... 56/13.6; 56/6

[58] Field of Search ................ 56/6, 13.6, 192, 295, 56/233, 235

[56] References Cited

U.S. PATENT DOCUMENTS

| | | | |
|---|---|---|---|
| 1,897,543 | 2/1933 | Albrecht | 56/233 |
| 3,524,306 | 8/1970 | Reber | 56/13.6 |
| 3,550,360 | 12/1970 | van der Lely | 56/6 |
| 3,708,966 | 1/1973 | Reber | 56/6 |
| 3,830,047 | 8/1974 | Asumendi | 56/6 |
| 3,979,889 | 9/1976 | Vansteelant | 56/192 |
| 4,007,578 | 2/1977 | Barstel, Jr. | 56/192 |
| 4,299,077 | 11/1981 | Wattron | 56/13.6 |

FOREIGN PATENT DOCUMENTS

| | | | |
|---|---|---|---|
| 2611515 | 11/1976 | Fed. Rep. of Germany | 56/13.6 |
| 7805129 | 11/1979 | Netherlands | 56/13.6 |
| 2030435 | 4/1980 | United Kingdom | 56/13.6 |

Primary Examiner—Paul J. Hirsch
Attorney, Agent, or Firm—Frishauf, Holtz, Goodman & Woodward

[57] ABSTRACT

A disk mower wherein a plurality of rotary disks each having a cutter blade are mounted on a laterally extending slender frame. A driving shaft having a rectangular or polygonal cross-section and extending through the inner passage of the slender frame slidably passes through a correspondingly shaped hole of one of a pair of bevel gears. The pair of bevel gears forms a power transmission mechanism for each rotary disk, the gears engaging each other and both secured to a bevel gear housing. Accordingly, the damaging influence of waved and/or twisted motion of the slender frame on the power transmission mechanisms, is prevented.

7 Claims, 4 Drawing Figures

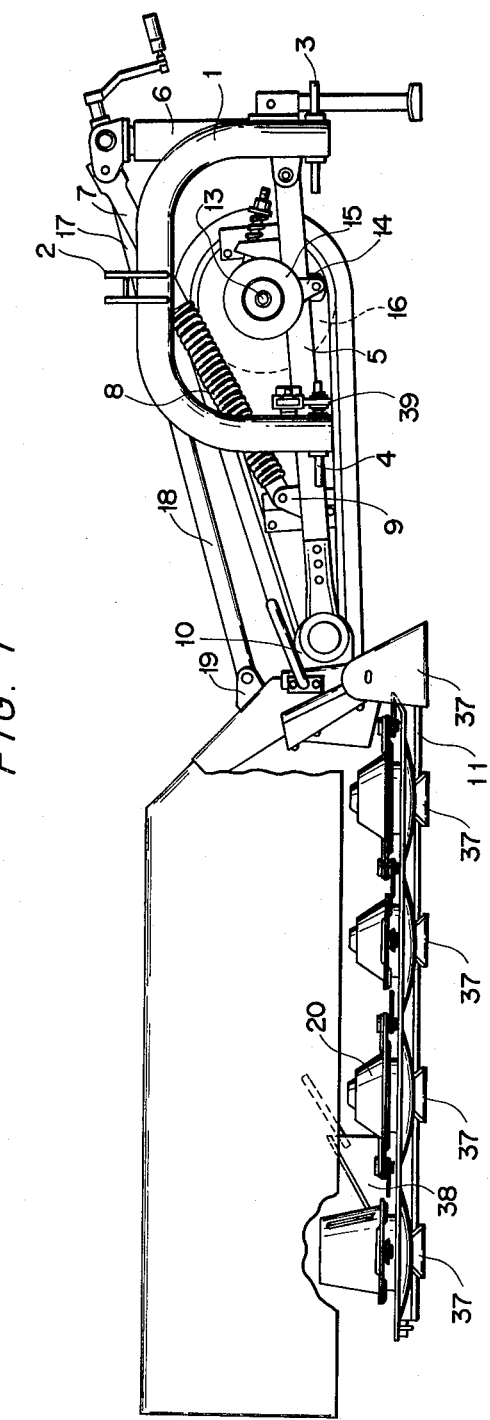

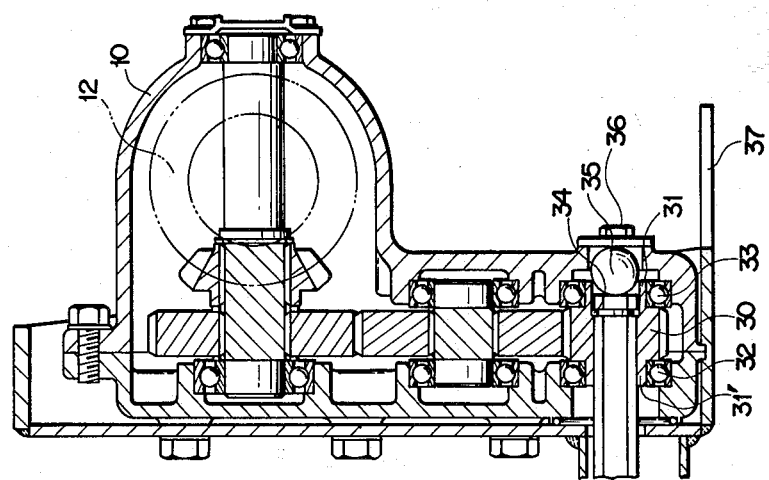
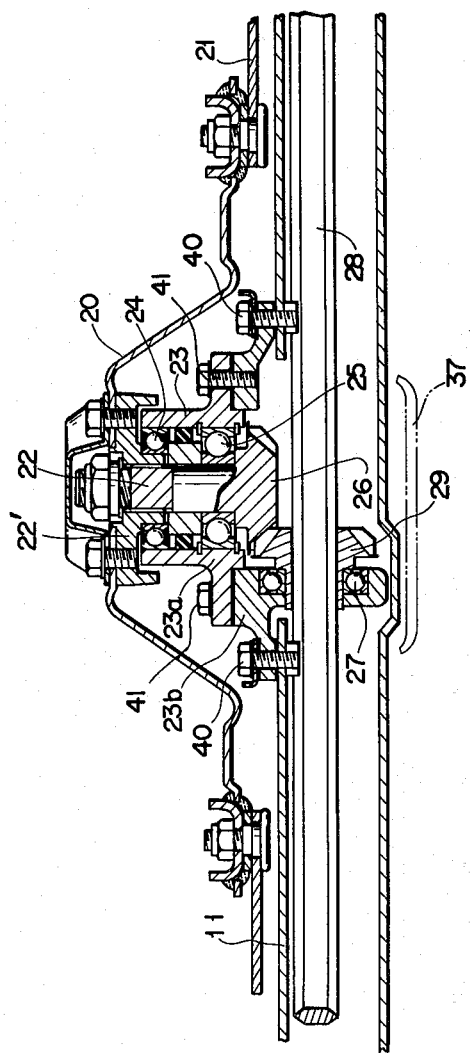

DISK MOWER

BACKGROUND OF THE INVENTION

This invention relates to a disk mower to be pulled by a farm tractor, and more particularly the power transmission mechanism thereof.

Disk mowers are provided with a plurality of cutter members arranged on a slender cutter frame which extends in the lateral direction, and are utilized for harvesting grass in meadows. Since, in the disk mower, cutter members are mounted at right angles on a driving shaft inserted in the cutter frame and, further, a disk provided with a cutter blade is rotated at high speed (generally 3000 rpm) to sever grass, the slender and long-extended cutter frame has a tendency to be waved and/or twisted during operations due to the vibration at the time of cutting. These deformations of the cutter frame are transmitted to the power transmission part of the disk as impact force so that the power transmission part receives excess load, which sometimes results in damage. Studies to overcome this defect has been undertaken in the past. One of them is to increase the rigidity of the cutter frame to prevent the deformations, by the strength of materials. This approach resulted in, however, the increase of weight and cost of the products, so that it is necessary to find a solution which does not result in the increase of weight and cost. In this connection, for instance, such solutions have been proposed as increasing backlash of the gears to absorb the deformations of the cutter frame, or as making the teeth of the gears large-sized to increase the accuracy of the supporting part of the gears. Australian Pat. No. 491002 disclosed this kind of solution. The former one generates, however, large noise while the latter introduces complex construction difficulty in maintenance and/or high product costs. Particularly, the maintenance problem is important because daily checks and/or adjustments have been carried out by disassembling the cutter frame in the past.

SUMMARY OF THE INVENTION

Accordingly, it is an object of the invention to provide an improved disk mower having no such deficiencies as described above.

Another object of the invention is to provide a disk mower capable of preventing excess loading on a power transmission part caused by deformations of cutter frame during a cutting operation, without increase of weight thereof.

A further object of the invention is to provide a disk mower capable of preventing excess loading on a power transmission part as well as minimizing noise and power-loss without increasing backlash of the teeth of the gears.

Still a further object of the invention is to provide a disk mower capable of preventing excess loading on a power transmission part with relatively simple construction and without increasing the strength of the teeth of the gears and the accuracy of the gear supporting part.

Another object of the invention is to provide a disk mower capable of preventing excess loading on a power transmission part while no adjustment of the engagement of the gears is required and wherein maintenance is not difficult.

Still another object of the invention is to provide a disk mower capable of preventing excess loading on a power transmission part while costs for manufacturing maintenance and the like are low.

According to this invention, there is provided a disk mower comprising: a laterally extending slender cutter frame; a plurality of bevel gear housings mounted on said cutter frame at suitable intervals; a main drive shaft having rectangular cross-section inserted into said cutter frame; a disk drive shaft arranged in the upper portion of each said bevel gear housing in the direction crossing the axis of said main drive shaft; a first bevel gear provided to the lower end of said disk drive shaft; a second bevel gear rotatably supported by the lower portion of said each bevel gear housing, said second bevel gear engaging said first bevel gear; said main drive shaft slidably passing though said second bevel gears at their rectangular holes; and a rotary disk having a cutter blade and mounted on said disk drive shaft.

BRIEF DESCRIPTION OF DRAWINGS

In the accompanying drawings:

FIG. 1 is a front view of a disk mower embodying the invention;

FIG. 2 is an enlarged sectional view of the speed-change case of the disk mower shown in FIG. 1;

FIG. 3 is an enlarged sectional view of the rotary disk of the disk mower shown in FIG. 1.

DESCRIPTION OF THE PREFERRED EMBODIMENT

Figure 4:
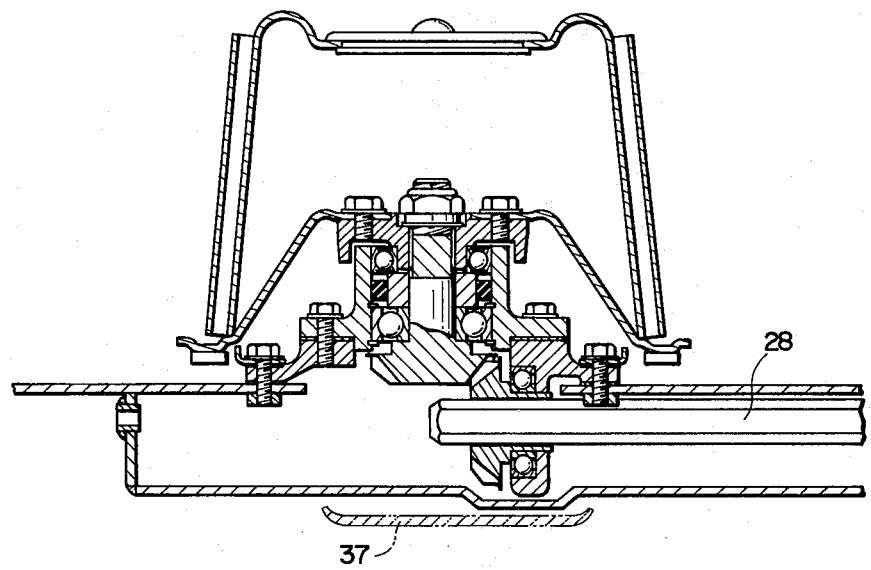
FIG. 4 is an enlarged sectional view of the last-end rotary disk of the disk mower shown in FIG. 1.

A connecting frame 1 is provided with a top-link bracket 2 and a pair of lower-link brackets 3, 4 to connect a disk mower to the tail side of a tractor, not shown. A mower frame 5 comprising a rectangular-sectional member is laterally extended and pivoted at one side end thereof to the lower end of a main mast 6 to swing in vertical, forward and rearward directions. The main mast 6 comprises a vertically arranged bar and supports the connecting frame 1. A floating member 7 comprises a round-sectional bar equipped with a spring 8 and is laterally extended above the mower frame 5. The floating member 7 is swingably pivoted at one side end to the main mast 6 and connected at other side end to a bracket 9 mounted on the mower frame 5 by pins. A speed-change case 10 rotatably connected to a side end of the mower frame 5, carries a cutter frame 11 at a lower side which is relatively narrow and extends in the direction transverse to the running direction of the disk mower, and is provided with a driven shaft at a rear side for mounting a driven pulley 12.

A power-input shaft 13 is received in a bearing case 15 mounted on the mower frame 5 by a U-shaped bolt 14. At the rear side of power-input shaft 13, a power-output shaft, not shown, is provided to mount a driving pulley 16 which is connected to the driven pulley 12 through a V-belt. A handle-lift device 17 is arranged above the mower frame 5 and connected to an oil-pressure-output, not shown, of a tractor by a oil-pressure hose. The device 17 is pivoted at the base end thereof to the upper end of the main mast 6, and the front end of a rod 18 of the device 17 is pivoted by a pin to a bracket 19 provided on the speed-change case 10. Each rotary disk 20 is provided with a plurality of rotary cutter blades 21 at suitable intervals at the outer periphery thereof. The rotary disk 20 is positioned above the cutter frame 11 and detachably secured by a bolt to the flange 22' of the disk drive shaft 22 which is vertically mounted on a main drive shaft 28.

A bevel gear housing 23 comprising an upper portion 23a and a lower portion 23b is arranged in the rotary disk 20. The upper portion 23a includes bearings 24, 25 while the lower portion 23b is detachably secured to the cutter frame 11 by a bolt 40. The upper and lower portions 23a, 23b are detachably secured by a pair of bolts 41 to one other. The above explained housing 23 can be utilized merely by turning it right to left for every cutter unit, wherein the rotary directions of the disks 20 will change, alternately. The upper portion 23a receives via bearings 24, 25 and rotatably holds the disk drive shaft 22 which is formed integrally with the bevel gear 26 at the lower portion of the shaft 22. Further, the lower portion 23b of the housing 23 and the bevel gear 29 are close-fitted via a bearing 27 arranged between the boss of the bevel gear 29 and the inner hole of the lower housing portion 23b. The upper and lower portions 23a, 23b of the bevel gear housing 23 are so assembled that the bevel gears 26, 29 received therein are engaged in most suitable condition, and thereafter the housing 23 as a whole is attached on the cutter frame 11.

The main drive shaft 28 has a polygonal cross-section and is releasably inserted into the cutter frame 11 in parallel therewith. The main drive shaft 28 extends through a rectangular or polygonal hole of the bevel gear 29 engaged with the bevel gear 26 under the disk drive shaft 22, and one end thereof of the device shaft 28 is rotatably supported by the speed-change case 10 while the other end is free. The main drive shaft 28 is received in the hole of the bevel gear 29 with about 0.2 mm spacing therebetween so as to be relatively slidable. Since both the main drive shaft 28 and the inner hole of the bevel gear 29 have polygonal cross-sections, the main drive shaft 28 duly transmits the rotary motion to the bevel gear 29 while relative sliding movement is allowed.

A gear 30 arranged in the speed-change case 10 via bearings 32, 33 is provided with bosses 31, 31' at both sides thereof. The gear 30 receives the one end of the main drive shaft 28 at a rectangular or polygonal hole thereof. The main drive shaft 28 is locked in the axial direction by a ring 34, and a ball bearing 35 is pressed to the front end face of the main drive shaft by a drain plug 36 arranged at the side surface of the speed-change case 10. A shoe 37 is arranged under the speed-change case 10 and the cutter frame 11. A glass board 38 is projected at the outer end of the cutter frame 11 to be curved rearwardly and inwardly. A security device 39 releasably connects the connecting frame 1 to the bracket provided on the mower frame 5.

The above constructed disk mower is operated as follows.

The disk mower is connected to the triplicate link mechanism of the rear end of the tractor by the connecting frame 1. The power input shaft 13, to which rotary power is transmitted via a known universal joint and the power take-off shaft of the tractor, drives the driving pulley 16 located in the rear side thereof to transmit the rotary power into the speed-change case 10 through the driven pulley 12 connected to the driving pulley 16 by the V-belt. The rotary power transmitted is suitably speed-changed in the speed-change case 10 and rotates the gear 30 to drive the main drive shaft 28. The main drive shaft 28 rotates while being supported by bearings 27 received in the lower portions 23b of the housings 23, which rotates the rotary disks 20 through the bevel gear 29, the bevel gear 26 and the disk drive shaft 22. Accordingly, the cutter blades are rotated to cut-off grass. The rod 18 of the handle-lift device 17 is set at its extended state. At this time, the cutter frame 11 is floated by the spring 8 so as to be cushioned on the uneven ground surface. When abnormal loading is applied by the cutter blades 21 when crushing stones and the like, the security device 39 functions to rotate the mower frame 5 rearwardly around the main mast 6 and shift cutter frame 11 rearwardly to prevent the damage of the cutter blades 21.

According to the above explained disk mower, as the outer end of the main drive shaft 28 is free and the main drive shaft 28 is slightly slidably received in the bevel gears 29, when the cutter frame 11 which is narrow and extended laterally is waved and/or twisted by shocks caused from vibrations in cutting operation and/or unintended shocks, these deformations are absorbed by the relative sliding movements of the main drive shaft 28 with respect to the bevel gears 29. Accordingly, distortion producing stress is not generated to the bevel gears 29 and damage of the gears is prevented.

Further, when the cutter frame 11 and/or the speed-change case 10 are to be disassembled for daily checkings and/or part-changes such as bevel gears 26, 29, bearings and so on, such disassembly is accomplished by releasing the drain plug 36, drawing-out the main drive shaft 28 to the drain plug side and releasing the housing 23 by removing the bolt 40, the upper and lower portions 23a, 23b of the housing 23 each being removed by releasing the bolts. Thus, maintenance and part-changes are very easily carried out.

Moreover, assembly can also be made easily by threading the housing 23 onto the cutter frame 11 and inserting the main drive shaft 28 into the cutter frame 11. At this time, since the engagement condition between bevel gears 26, 29 is suitably preset, it is unnecessary to adjust it.

What is claimed is:

1. A disk mower comprising:
   a cutter frame;
   a plurality of bevel gear housings mounted on said cutter frame at selected intervals;
   a main drive shaft having at least a four-sided cross-section and means at one end of said main drive shaft for supporting said main drive shaft proximate to said cutter frame wherein the other end of said main drive shaft is free and unobstructed in the axial direction of said main drive shaft;
   a disk drive shaft mounted for rotation in an upper portion of each of said bevel gear housings and extending in a direction transverse to the axis of said main drive shaft;
   a first bevel gear fixed at the lower end of said disk drive shaft;
   a second bevel gear rotatably supported by a lower portion of each of said bevel gear housings, said second bevel gear engaging said first bevel gear and having an axial opening corresponding to said at least four-sided cross-section of said main drive shaft;
   said main drive shaft being arranged to slidably pass through the openings of said second bevel gears for relative free sliding movement in the axial direction in response to deformation producing forces applied to one of said cutter frame, said disk drive shaft and said main drive shaft; and a rotary disk having a cutter blade and mounted on said disk drive shaft for rotary cutting movement in response to rotation of said main drive shaft.

2. The disk mower according to claim 1, wherein each of said bevel gear housings comprises an upper part forming said upper portion and a lower part forming said lower portion wherein said upper part and said lower part are releasably secured to each other.

3. The disk mower according to claim 1 wherein said main drive shaft is received through each said second bevel gear with a clearing spacing of about 0.2 mm.

4. The disk mower according to claim 2 wherein said main drive shaft is received through each said second bevel gear with a clearing spacing of about 0.2 mm.

5. The disk mower of claim 2, including first means for releasably fastening the upper bevel gear housing part to the lower bevel gear housing part so that when said first means is released, said upper part can be separated from said lower part to release the engagement between the first and the second bevel gears, and said first bevel gear, said disk drive shaft and said rotary disk with said cutter blade can be removed without disassembly of said main drive shaft.

6. The disk mower of claim 5, wherein said first means comprises threaded bolts.

7. The disk mower of claim 5, including second means for releasably fastening the lower bevel gear housing to said cutter frame, said second fastening means being independent of said first fastening means.

* * * * *